United States Patent
Uenishi

(10) Patent No.: US 9,448,552 B2
(45) Date of Patent: Sep. 20, 2016

(54) NUMERICALLY-CONTROLLED MACHINE TOOL AND SPINDLE ERROR COMPENSATING METHOD THEREOF

(71) Applicant: FANUC Corporation, Yamanashi (JP)

(72) Inventor: Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 281 days.

(21) Appl. No.: 14/225,628

(22) Filed: Mar. 26, 2014

(65) Prior Publication Data

US 2014/0297022 A1 Oct. 2, 2014

(30) Foreign Application Priority Data

Mar. 27, 2013 (JP) .................. 2013-066874

(51) Int. Cl.
*G05B 19/404* (2006.01)

(52) U.S. Cl.
CPC ... *G05B 19/404* (2013.01); *G05B 2219/50297* (2013.01)

(58) Field of Classification Search
None
See application file for complete search history.

(56) References Cited

U.S. PATENT DOCUMENTS 5,329,457 A * 7/1994 Hemmerle ......... G05B 19/4015
318/572
2012/0323373 A1* 12/2012 Sato .................... G05B 19/404
700/275

FOREIGN PATENT DOCUMENTS

| DE | 60315050 T2 | 4/2008 |
|----|----|----|
| DE | 112005002399 B4 | 6/2009 |
| DE | 102010043798 A1 | 9/2011 |
| EP | 2835702 A1 | 2/2015 |
| JP | 4-256526 A | 9/1992 |
| JP | 10-301609 A | 11/1998 |
| JP | 2002-215211 A | 7/2002 |
| JP | 2008-73813 A | 4/2008 |
| JP | 2010-201581 A | 9/2010 |
| JP | 2010-284750 A | 12/2010 |
| JP | 2011-152599 A | 8/2011 |
| WO | 2004/033147 A2 | 4/2004 |
| WO | 2006/036120 A1 | 4/2006 |

OTHER PUBLICATIONS

Office Action dated Jul. 24, 2015, corresponding to German patent application No. 102014104170.4.
Decision to Grant a Patent mailed Dec. 2, 2014, corresponding to Japanese patent application No. 2013-066874.

\* cited by examiner

*Primary Examiner* — Mohammad Ali
*Assistant Examiner* — Saad M Kabir
(74) *Attorney, Agent, or Firm* — Hauptman Ham, LLP

(57) ABSTRACT

A spindle error measurement jig is attached to a spindle of a numerically-controlled machine tool. A probe capable of measurement in a moving axis direction of each axis of the machine tool is installed on a table. By means of driving-control of a linear shaft driving the table and a linear shaft elevating a spindle head, spindle error measurement is made by measuring a spindle center position measurement hole and a spindle angular deviation measurement end-face so as to make spindle error calculation. On the basis of the calculation result, an angular deviation and a spindle error compensation amount are acquired, and they are used as parameters for compensating relative movement amounts of the table and the spindle so as to correct the spindle error.

8 Claims, 14 Drawing Sheets

SPINDLE FIXED TO MOVING AXIS WITHOUT ASSEMBLING ERROR

SPINDLE FIXED TO MOVING AXIS WITHOUT ASSEMBLING ERROR

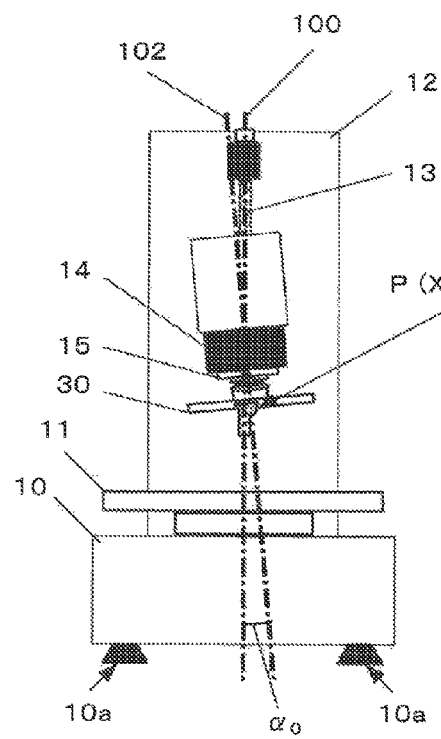
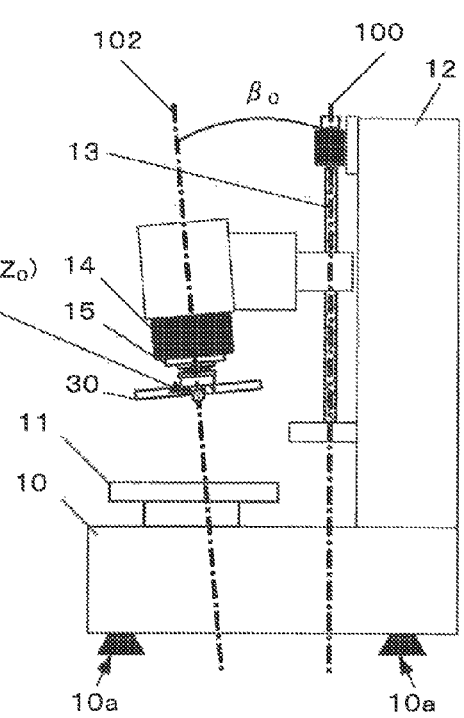
FIG. 2A
SPINDLE FIXED TO MOVING AXIS WITH ASSEMBLING ERROR
FIG. 2B
SPINDLE FIXED TO MOVING AXIS WITH ASSEMBLING ERROR

FIG. 3A
SPINDLE FIXED TO MOVING AXIS WITH
ASSEMBLING ERROR AND DEFORMATION
FIG. 3B
SPINDLE FIXED TO MOVING AXIS WITH
ASSEMBLING ERROR AND DEFORMATION
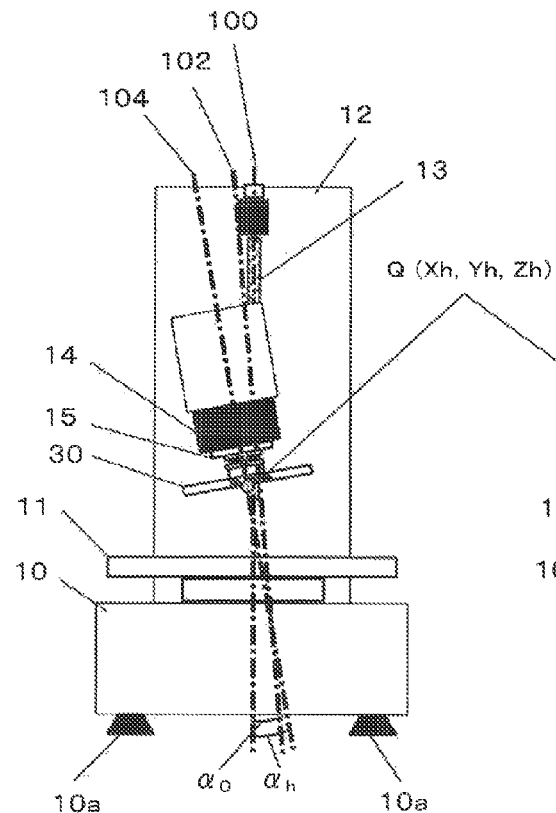
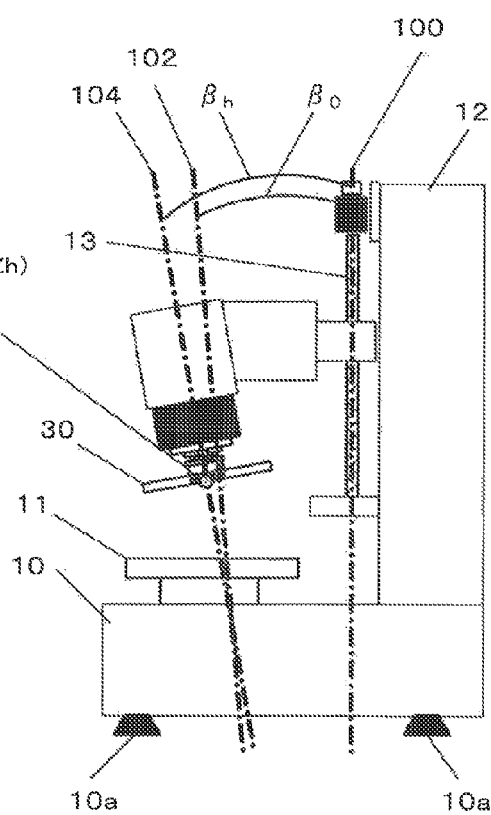
SPINDLE CENTER POSITION
ERROR AMOUNT
$(\Delta X, \Delta Y, \Delta Z)$
$\Delta X = X_o - X_h$
$\Delta Y = Y_o - Y_h$
$\Delta Z = Z_o - Z_h$

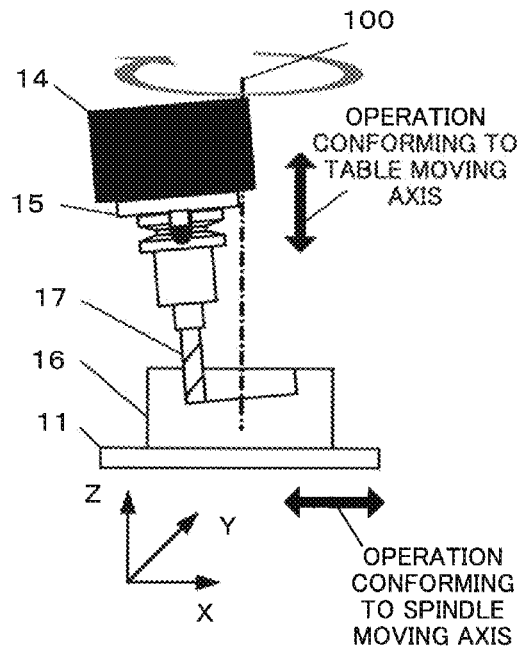
FIG. 4A END MILL MACHINING
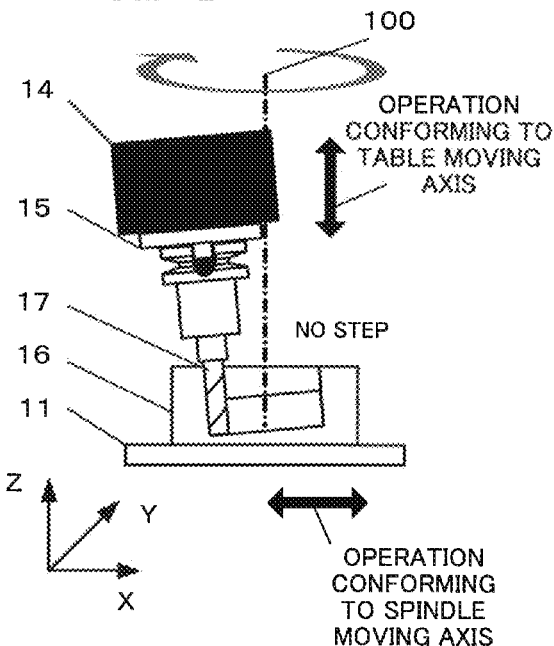
FIG. 4B END MILL MACHINING
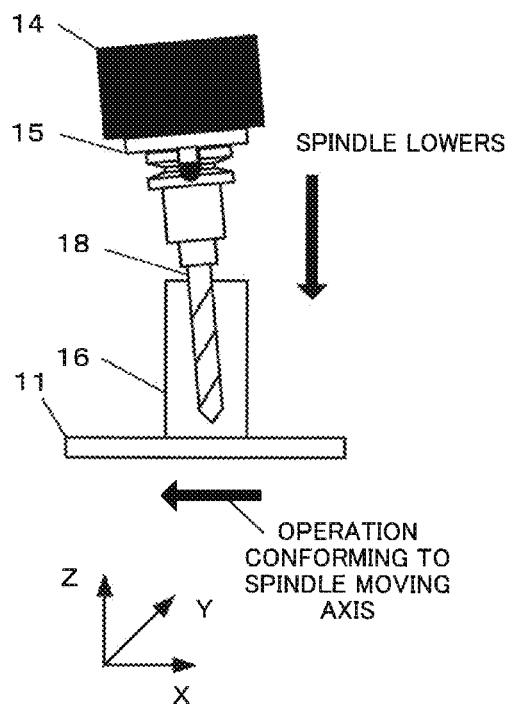
FIG. 4C DRILLING

WITH SPINDLE ERROR
COMPENSATION ROTARY TABLE

WITH SPINDLE ERROR
COMPENSATION ROTARY TABLE

STANDARD POSITION

AT ($\theta_C$, $\theta_A$) COMPENSATION

SIDE VIEW OF SPINDLE ERROR
MEASUREMENT JIG

CENTER AXIS

SPINDLE ERROR MEASUREMENT JIG
VIEWED IN DIRECTION OF ARROW 34

FIG. 8A
SIDE VIEW OF SPINDLE ERROR MEASUREMENT JIG
FIG. 8B
SPINDLE ERROR MEASUREMENT JIG VIEWED IN DIRECTION OF ARROW 34
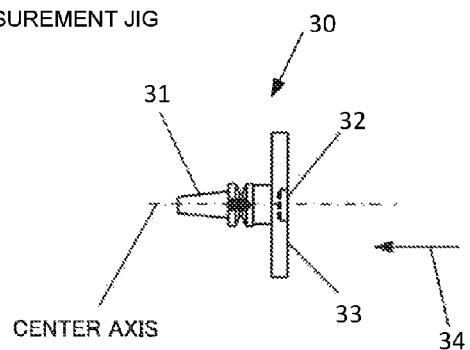
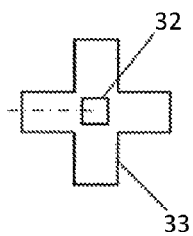
FIG. 9
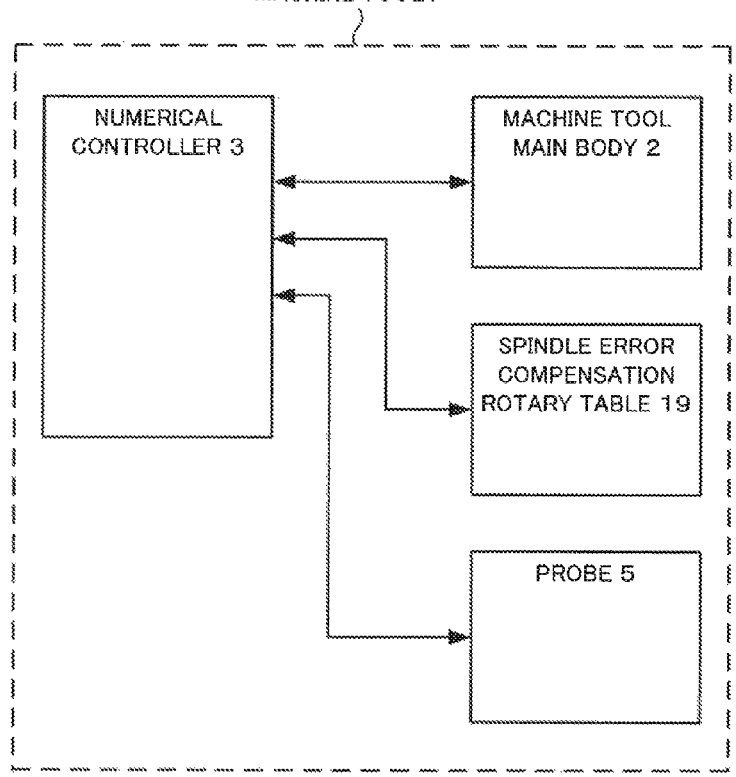

MEASUREMENT USING SPINDLE ERROR MEASUREMENT JIG

MEASUREMENT USING SPINDLE ERROR MEASUREMENT JIG

CONTROLLING SPINDLE ERROR COMPENSATION

FIG. 13A
CONTROLLING SPINDLE ERROR
COMPENSATION
FIG. 13B
CONTROLLING SPINDLE ERROR
COMPENSATION
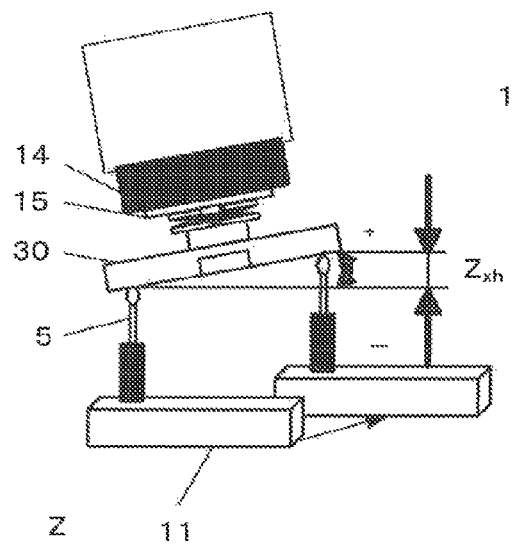
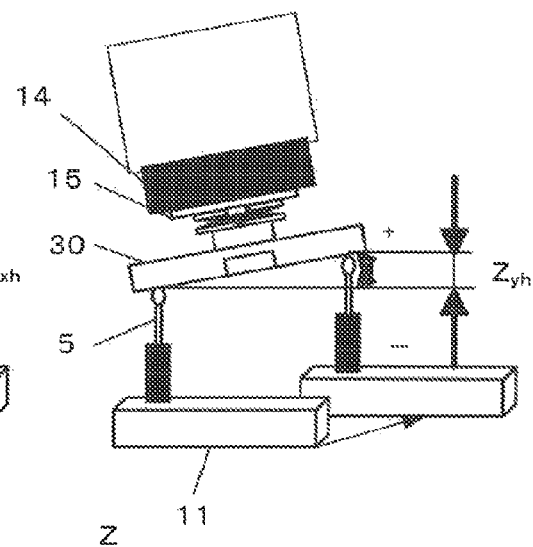

HOW TO ACQUIRE $\theta_C$

HOW TO ACQUIRE $\theta_A$

END MILL MACHINING

DRILLING

END MILL MACHINING

DRILLING

NUMERICALLY-CONTROLLED MACHINE TOOL AND SPINDLE ERROR COMPENSATING METHOD THEREOF

RELATED APPLICATIONS

The present application claims priority to Japanese Application Number 20 13-066874, filed Mar. 27, 2013, the disclosure of which is hereby incorporated by reference herein in its entirety.

BACKGROUND OF THE INVENTION

1. Field of the Invention

The present invention relates to a numerically-controlled machine tool provided with a spindle error compensation function and the spindle error compensating method for the numerically-controlled machine tool.

2. Description of the Related Art

In a machine tool provided with a spindle fixed to a linear moving axis or a rotary axis and a table having one or more linear moving axes or rotary axes and also provided with a numerical controller for controlling an operation of the spindle and the table, when a vertical or parallel machining is to be performed on a machining surface of a workpiece with high accuracy, highly accurate working can be realized by installing the workpiece or the machining surface perpendicularly or parallelly with accuracy with respect to the moving axis.

However, when the workpiece is to be machined by being attached to the machine tool by using a jig such as a stock vice or a chuck, it is likely that the machining surface is inclined with respect to the moving axis and cannot be necessarily perpendicular or parallel, and manual fine adjustment is needed each time.

In response to that, a method in which the inclination of the workpiece or the machining surface is measured before machining, and a table on which the workpiece is installed is subjected to inclination compensation according to inclination acquired by the measurement for highly accurate machining of the machining surface is disclosed in Japanese Patent Application Laid-Open No. 2010-201581.

However, the technology disclosed in Japanese Patent Application Laid-Open No. 2010-201581 is only to compensate inclination of the workpiece, and if the spindle holding a machining tool is installed perpendicularly or parallelly with high accuracy with respect to the table on which the workpiece is placed, highly accurate machining is possible as illustrated in FIGS. 16A and 16B, but if the spindle is not installed perpendicular to or parallel to the table, it causes occurrence of defective machining such as a step in milling as illustrated in FIGS. 17A, 17B, and 17C and deformation of a drill in drilling.

FIG. 16A illustrates an example of two-stage pocket machining by end mill machining on a workpiece placed on the table. FIG. 16B illustrates an example of drilling on a workpiece placed on the table. FIG. 17A illustrates an example of pocket machining in two stages by end mill machining on a workpiece placed on the table. FIG. 17B illustrates an example of drilling on a workpiece placed on the table. As illustrated in FIGS. 17A, 17B, and 17C, if the spindle is not perpendicular to the workpiece on the table, defective machining or breakage of a tool is caused.

SUMMARY OF THE INVENTION

The present invention was made in view of the above described problems of the prior-art technologies and has an object to provide a numerically-controlled machine tool provided with a spindle fixed to a linear moving axis, a table having two or more linear moving axes, a rotary table for fixing a workpiece, installed on the table and having two or more rotary axes, and a numerical controller for controlling the spindle and the tables, having a function of compensating a spindle error caused by an assembling error in a manufacturing stage of a machine tool main body or an error by deformation of the machine tool main body caused by heat generated during machining of the workpiece; and a spindle error compensating method of the numerically-controlled machine tool.

The numerically-controlled machine tool according to the present invention is provided with a linear moving axis for moving the spindle, two or more linear moving axes for moving the table, a rotary table for fixing the workpiece, installed on the table and having two or more rotary axes, and a numeral controller for controlling the spindle, the linear moving axes, and the rotary axes so as to machine the workpiece. Moreover, this numerically-controlled machine tool is provided with a spindle error measurement jig which is a member to be measured, attached to the spindle and provided with a spindle center position measurement hole having an inner surface which is a surface to be measured in parallel with a spindle axis and a spindle angular deviation measurement end-face which is a surface to be measured perpendicular to the spindle axis, a probe installed on the table and detecting the spindle center position measurement hole of the spindle error measurement jig and the end face of the spindle angular deviation measurement, a spindle angular deviation calculation unit for calculating a spindle angular deviation from a result of attaching the spindle error measurement jig to the spindle and measuring the inner surface and the end face of the spindle error measurement jig by the probe, a compensation amount calculation unit for calculating a compensation amount for compensating positions of the table and the rotary table from the calculated spindle angular deviation, and a position compensation unit for moving the linear moving axis and the rotary table on the basis of the compensation amount.

The spindle angular deviation calculation unit may acquire a spindle center position from a result of measurement by the probe of three or more points on the same plane which is the inner surface of the hole of the spindle error measurement jig and may calculate the spindle angular deviation from a result of measurement of three or more points on a circle having an arbitrary diameter around an intersection with a line obtained by lowering the end face of the spindle error measurement jig perpendicularly to the end face of the spindle error measurement jig from the spindle center position. Moreover, the spindle angular deviation calculation unit may, in addition to the spindle angular deviation, calculate a spindle attaching error of the spindle error measurement jig and may calculate a compensation amount for compensating the positions of the table and the rotary table from the spindle attaching error and the spindle angular deviation.

The position compensation unit compensates each of the rotary axes with respect to each of the two or more rotary axes of the rotary table on the basis of the compensation amount, compensates the position of the workpiece perpendicular to or parallel to the spindle and calculates a relative movement compensation amount of each of the linear moving axes on the basis of the compensation amount so that the spindle moves perpendicular to or parallel to the workpiece in accordance with a movement instruction of each of the linear moving axes, and may execute relative movement compensation on the basis of the relative movement compensation amount.

According to the present invention, the spindle error compensating method of a numerically-controlled machine tool provided with a numerical controller for controlling the linear moving axis and the rotary axis includes a step of attaching the spindle error measurement jig which is a member to be measured, provided with a spindle center position measurement hole having the inner surface which is a surface to be measured in parallel with the spindle axis of the machine tool and a spindle angular deviation measurement end-face which is a surface to be measured and perpendicular to the spindle axis to the spindle; a step of detecting the spindle center position measurement hole and the spindle angular deviation measurement end-face by the spindle error measurement jig by using the probe installed on the table for fixing the rotary table on which the workpiece is placed; a step of calculating the spindle angular deviation from a result of detection of the inner surface and the end face of the spindle error measurement jig by the probe; a step of calculating a compensation amount for compensating positions of the table and the rotary table from the calculated spindle angular deviation; and a step of moving the linear moving axis and the rotary table on the basis of the compensation amount.

The spindle angular deviation may be calculated by acquiring the spindle center position from the result of measurement of three or more points on the same plane which is the inner surface of the hole of the spindle error measurement jig by the probe and the result of measurement of three or more points on the circle having an arbitrary diameter around an intersection with a line obtained by lowering the end face of the spindle error measurement jig perpendicularly to the end face of the spindle error measurement jig from the spindle center position.

In addition to the spindle angular deviation, a spindle attaching error of the spindle error measurement jig may be calculated, and the compensation amount for compensating the positions of the table and the rotary table may be calculated from the spindle attaching error and the spindle angular deviation.

Regarding the movement, each of the rotary axes may be compensated with respect to each of the two or more rotary axes of the rotary table on the basis of the compensation amount, the position of the workpiece may be compensated perpendicular to or parallel to the spindle, the relative movement compensation amount of each of the linear moving axes may be calculated on the basis of the compensation amount so that the spindle moves perpendicular to or parallel to the workpiece in accordance with the movement instruction of each of the linear moving axes, and relative movement compensation may be made on the basis of the relative movement compensation amount.

By means of the present invention, the numerically-controlled machine tool provided with the spindle fixed to a linear moving axis, the table having two or more linear moving axes, the rotary table for fixing the workpiece, installed on the table and having two or more rotary axes, and the numerical controller for controlling the spindle and the table, having a function for compensating the spindle error caused by the assembling error in the manufacturing stage of the machine tool main body or the error by deformation of the machine tool main body caused by heat generated during machining of the workpiece; and the spindle error compensating method of the numerically-controlled machine tool can be provided.

BRIEF DESCRIPTION OF THE DRAWINGS

The above described and other objects and features of the present invention will be made obvious from the following explanation of an embodiment by referring to the attached drawings, in which:

FIGS. 2A and 2B are diagrams for explaining an example of a spindle fixed to a moving axis in a state with an assembling error;

FIGS. 3A and 3B are diagrams for explaining an example of a spindle fixed to a moving axis in a state with an assembling error and deformation;

FIGS. 4A, 4B, and 4C are diagrams for explaining a case in which a workpiece is relatively moved with respect to a spindle axis;

FIGS. 8A and 8B are diagrams for explaining another example of the spindle error measurement jig;

FIG. 9 is a block diagram illustrating a configuration of a machine tool provided with a spindle error compensation function according to an embodiment of the present invention;

FIGS. 13A and 13B are diagrams for explaining means for controlling spindle error compensation (No. 3);

DETAILED DESCRIPTION OF THE PREFERRED EMBODIMENTS

The present invention relates to a numerically-controlled machine tool provided with a spindle fixed to a linear moving axis, a table having two or more linear moving axes, and a rotary table for fixing a workpiece, installed on the table and having two or more rotary axes and also provided with a numerical controller for controlling the spindle and the table. This numerically-controlled machine tool employs the following embodiment in order to solve problems of an assembling error of the spindle fixed to the moving axis during a manufacturing stage of a machine tool main body and an error due to displacement of the spindle caused by deformation by heat generated during machining.

Figures 1A, 1B:
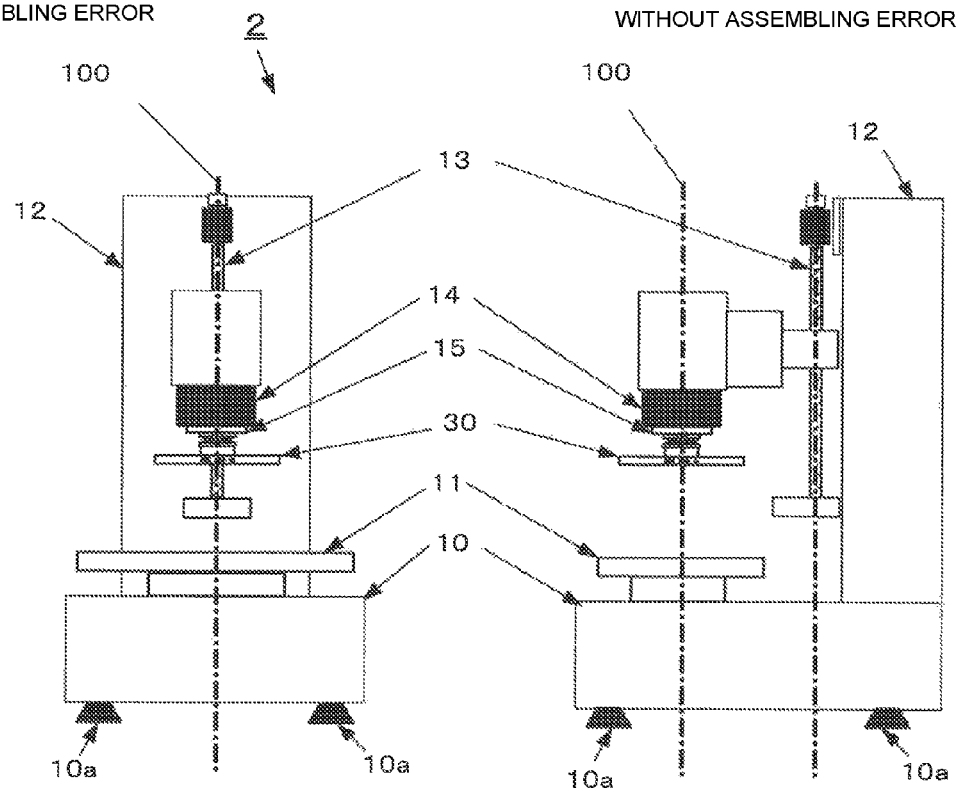
FIGS. 1A and 1B are diagrams for explaining an example of a spindle fixed to a moving axis in a state without an assembling error.

The machine tool will be described by using FIG. 1.

The machine tool 1 includes a machine tool main body 2 and a numerical controller 3 (see FIG. 9) controlling the machine tool main body 2. First, the machine tool main body 2 will be described. A bed 10 is formed having a substantially rectangular shape elongated in the Y-axis direction (longitudinal direction of the machine tool main body 2) and molded by casting a metal material such as a cast iron in a die. A leg portion 10a with adjustable height is provided at each of four corners of a lower part of the bed 10. By installing these leg portions 10a on a floor surface of a plant or the like, the machine tool 1 is installed at a predetermined spot.

The machine tool main body 2 is provided with the bed 10, a rectangular solid column 12 extending vertically upward from a rear on an upper part of the bed 10, a moving axis (Z-axis) 13 provided along a front surface of the column 12, a spindle head 14 provided capable of elevation along the front surface of the column 12 by the moving axis (Z-axis) 13, a tool attaching portion 15 fixed to the spindle extended vertically downward from the lower part of the spindle head 14 and to which a tool holder is attached and replaced, and a table 11 provided on the upper part of the bed 10 and removably fixing a workpiece. In the machine tool main body 2, the spindle and each of the moving axes are controlled by a controller (not shown). The table 11 is driven by a motor (not shown) and moves in directions of the X-axis and the Y-axis.

In manufacture of a machine tool main body 2 of the machine tool 1, since it is difficult to manufacture the machine tool main body 2 with the spindle fixed to a moving axis adjusted to an accurate position and direction, an error is caused in the position and direction of the spindle. This error is caused when a spindle axis 102 has an angular deviation A ($\alpha_0$, $\beta_0$) with respect to the moving axis (Z-axis) to which the spindle axis 102 is fixed, as illustrated in FIGS. 2A and 2B, although the spindle axis 102 should have been installed perpendicular (to the X-axis and the Y-axis) or parallel (to the Z-axis) to the moving axis to which the spindle is fixed (see FIG. 1). A spindle center position P at this time is assumed to be ($X_0$, $Y_0$, $Z_0$). In the following, this error will be referred to as a "fixed error".

Moreover, in addition to this "fixed error", the machine tool main body 2 of the machine tool 1 is deformed by heat generated during machining or a change in an outside air temperature, and as illustrated in FIGS. 3A and 3B, the spindle axis moves from the spindle axis 102 to a spindle axis 104. Then, as illustrated in FIGS. 3A and 3B, an angular deviation B ($\alpha_h$, $\beta_h$) is generated with respect to a spindle center position Q ($X_h$, $Y_h$, $Z_h$) and the moving axis to which the spindle is fixed. By means of deformation of the machine tool main body 2 of the machine tool 1, the spindle center position moves from the spindle center position P ($X_0$, $Y_0$, $Z_0$) to the spindle center position Q ($X_h$, $Y_h$, $Z_h$).

A difference between the spindle center position P ($X_0$, $Y_0$, $Z_0$) as a reference position and the spindle center position Q ($X_h$, $Y_h$, $Z_h$) as the result of deformation applied to the machine tool main body 2 is assumed to be a spindle center position error amount ($\Delta X$, $\Delta Y$, $\Delta Z$). The spindle center position error amount ($\Delta X$, $\Delta Y$, $\Delta Z$) is, as illustrated in FIGS. 3A and 3B, expressed as difference of position of each axis ($\Delta X = X_0 - X_h$, $\Delta X = Y_0 - Y_h$, $\Delta Z = Z_0 - Z_h$).

The spindle center position P ($X_0$, $Y_0$, $Z_0$), the spindle center position Q ($X_h$, $Y_h$, $Z_h$), the angular deviation A ($\alpha_0$, $\beta_0$), and the angular deviation B ($\alpha_h$, $\beta_h$) can be acquired by using a specific tool (spindle error measurement jig) and a probe as will be described later.

Figure 16A:
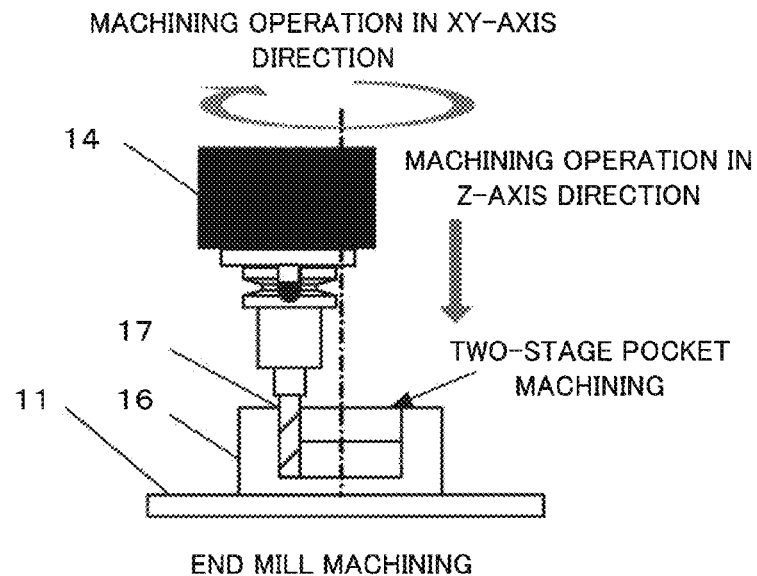
FIGS. 16A and 16B are diagrams for explaining a machining example when the spindle is perpendicular with respect to the workpiece.
Figure 16B:
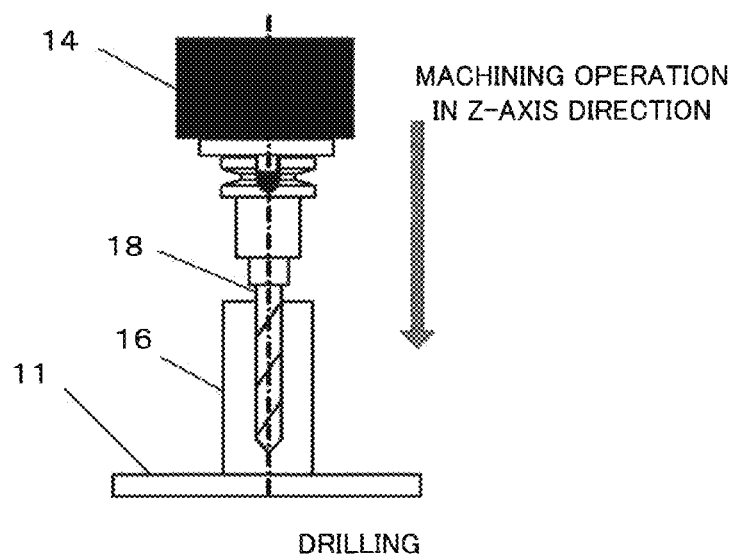

In prior art, due to a deviation of the spindle axis from the vertical direction, caused during manufacture of the machine tool main body 2 of the machine tool 1, the machine tool 1 does not perform machining in a state where the spindle does not have any angular deviation as in FIGS. 16A and 16B, but actually, as illustrated in FIGS. 2A and 2B or FIGS. 3A and 3B, machining is performed in a state where the spindle is at the spindle center position P ($X_0$, $Y_0$, $Z_0$) or the spindle center position Q ($X_h$, $Y_h$, $Z_h$) and has an angular deviation A ($\alpha_0$, $\beta_0$) or the angular deviation B ($\alpha_h$, $\beta_h$).

According to the machine tool 1 of one embodiment of the present invention, on the other hand, the spindle center position error amount ($\Delta X$, $\Delta Y$, $\Delta Z$), which is an error caused by a change in an outside air temperature around the machine tool, heat generation by the spindle rotation operation and the like in each axis, a spindle error occurrence operation after machining, after a warm-up operation and the like, is compensated to respective axes, thereby allowing to perform machining with an error caused by the spindle error occurrence operation compensated.

Figure 17A:
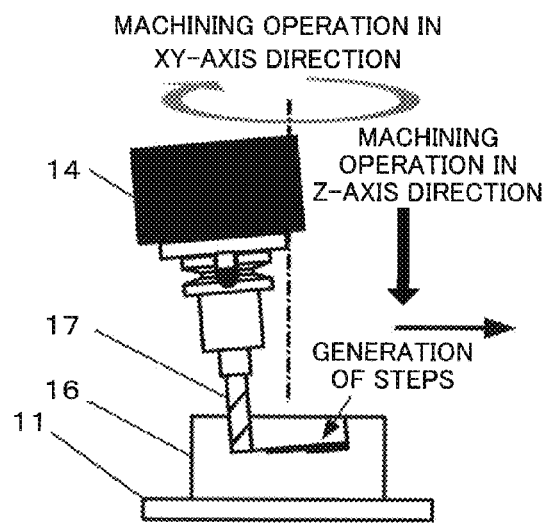
FIGS. 17A, 17B, and 17C are diagrams for explaining a machining example if the spindle is not perpendicular to the workpiece.
Figure 17B:
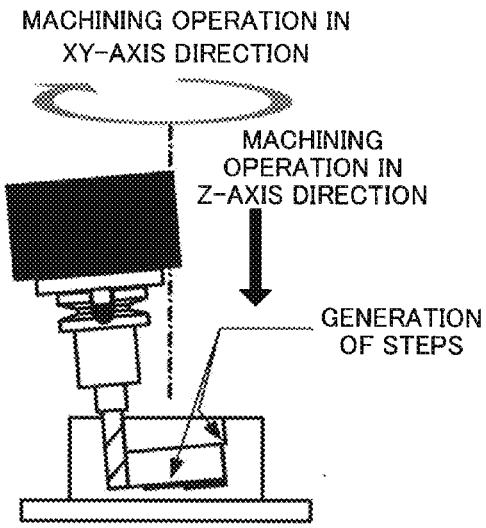
Figure 17C:
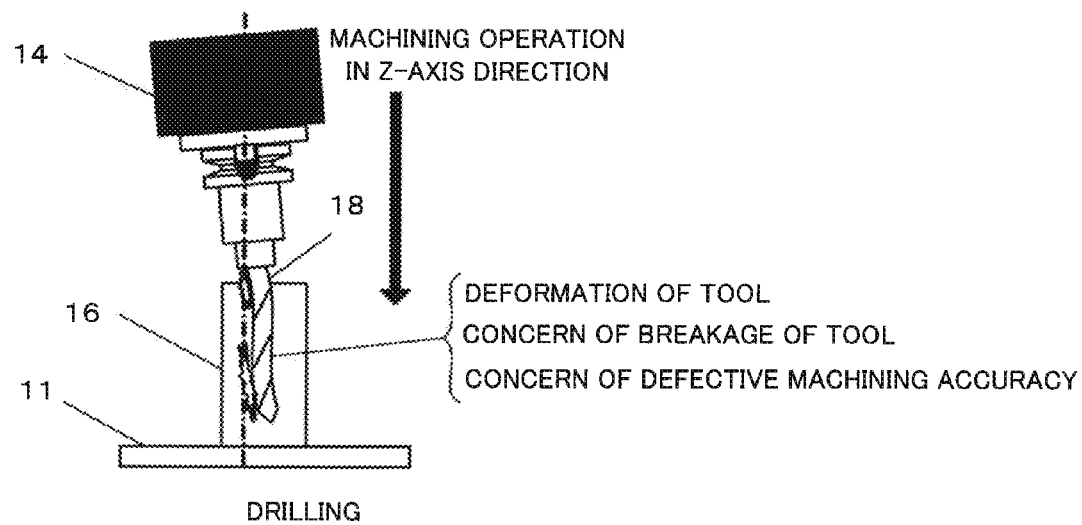

However, compensating such spindle center position error amount ($\Delta X$, $\Delta Y$, $\Delta Z$) to respective axes does not take account of an angular deviation of the spindle. As illustrated in examples in FIGS. 17A, 17B and 17C, in a machining using an end mill of which height and position are varied, a step is produced by the spindle angular deviation, whereas in a machining using a drill, since a drilling start position, an end position, and a drill position are different, defective machining such as deformation of a machining hole, abnormal abrasion of a tool, breakage of a tool, defective accuracy and the like occurs due to an abnormal load.

In order to solve such problems, if the spindle is fixed to the moving axis (fixed to the Z-axis, in the case of FIG. 1), highly accurate machining can be realized by modifying the spindle angular deviation by static accuracy adjustment of the spindle before start of machining or during machining. However, static accuracy adjustment of the machine before machining is difficult in actuality, and it is impossible to adjust variable deformation of a machine tool caused by a change in outside air temperature and heat generation by the spindle rotation operation with static accuracy adjustment.

Figure 5A:
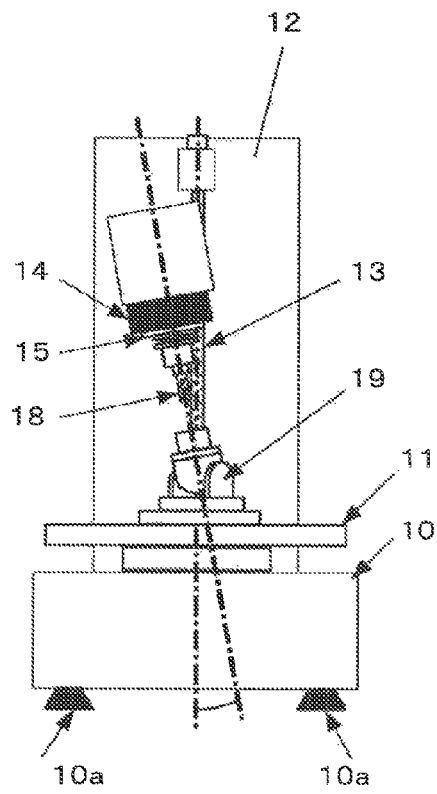
FIGS. 5A and 5B are diagrams for explaining an example in which a spindle error compensation rotary table is placed.
Figure 5B:
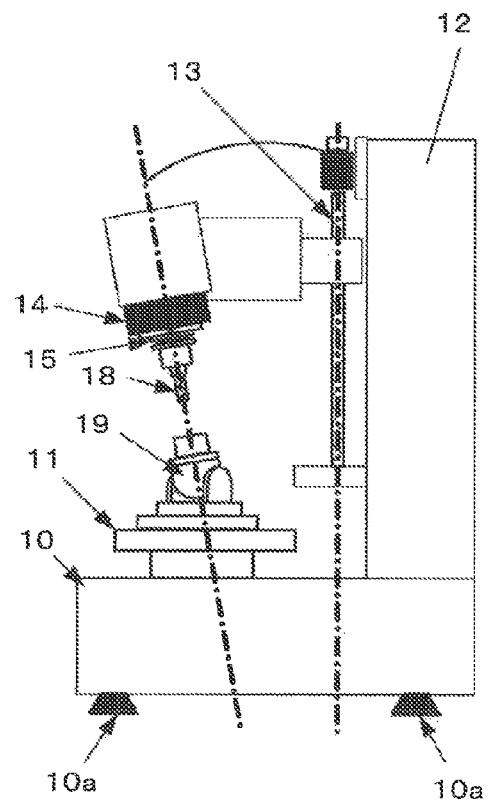

Thus, by fixing the spindle having the angular deviation to the moving axis and by relatively moving the workpiece so as to operate perpendicular to or parallel to the spindle axis, highly accurate and stable machining can be realized for the tool attached to the spindle (see FIGS. 4A, 4B and 4C, where the spindle is fixed to the Z-axis). FIGS. 4A and 4B are diagrams for explaining end mill machining. FIG. 4C is a diagram for explaining drilling. Moreover, by controlling respective axes (inclined axis (A-shaft) 20, a rotary axis (C-shaft) 21) of a spindle error compensation rotary table 19 conforming to the angular deviation of the spindle measured as shown in FIGS. 5A and 5B and by changing an attitude of a workpiece 16, highly accurate machining of the workpiece 16 can be realized.

In order to perform highly accurate machining on the workpiece 16 by using a tool (an end mill 17, a drill 18 and the like) attached to the spindle, it is necessary to compensate the angular deviation with respect to the spindle which has undergone uneven deformation by the spindle error occurrence operation to realize the above described machining as illustrated in FIGS. 4A, 4B, and 4C or FIGS. 5A and 5B.

Figure 7A:
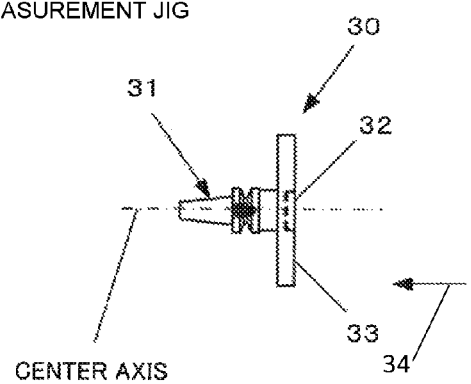
FIGS. 7A and 7B are diagrams for explaining an example of a spindle error measurement jig.
Figure 7B:
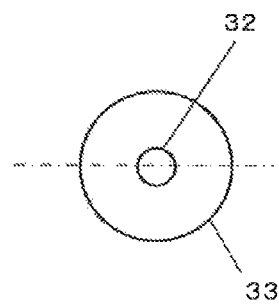

Thus, first, in order to measure the spindle center position Q ($X_h$, $Y_h$, $Z_h$), a spindle error measurement jig 30 illustrated in FIGS. 7A and 7B is attached to the spindle instead of a tool (specifically, a jig holder 31 of the spindle error measurement jig 30 is attached to the tool attaching portion 15). The spindle center position P can be similarly measured.

FIGS. 7A and 7B are diagrams for explaining an example of the spindle error measurement jig. FIG. 7A is an outline diagram of the spindle error measurement jig as viewed from a side surface. FIG. 7B is a diagram of the spindle error measurement jig as viewed from a direction of an arrow 34.

The spindle error measurement jig 30 is provided with the jig holder 31 for attachment to the tool attaching portion 15 of the spindle, a spindle center position measurement hole 32 that has an inner peripheral surface parallel to the spindle axis (center axis), and an spindle angular deviation measurement end-face 33 which is a surface to be measured and perpendicular to the spindle axis. A cross-section orthogonal to a depth direction of the spindle center position measurement hole 32 and the spindle angular deviation measurement end-face 33 both have a circular shape. In FIGS. 8A and 8B, the shape of the spindle angular deviation measurement end-face 33 in the spindle error measurement jig 30 is cross, as one major example.

The spindle error measurement jig 30 may have a disk shape or any other shapes other than the cross as long as the shape has a measurement range perpendicular to the spindle axis. Moreover, the shape of the spindle center position measurement hole 32 may be a circle or a square, for example, but the shape may be any other than a circle or a square as long as it has a measurement range parallel to the spindle axis.

FIG. 9 is a block diagram illustrating a configuration of the machine tool provided with a spindle error compensation function according to the embodiment of the present invention. In the embodiment of the present invention, the machine tool 1 is provided with the machine tool main body 2, the spindle error compensation rotary table 19, a probe 5, and the numerical controller 3. The numerical controller 3 controls operations of the machine tool main body 2 and the spindle error compensation rotary table 19 and obtains a detection signal of the spindle error measurement jig 30 outputted from the probe 5.

At each of the moving axes (X-axis, Y-axis, Z-axis) of the machine tool main body 2 and each of the rotary axes (C-axis, A-axis) of the spindle error compensation rotary table 19, a position detector (not shown) is provided, and a feedback signal from each of the position detectors is inputted into the numerical controller 3. The numerical controller 3 controls the entire machine tool 1. The numerical controller 3 outputs a drive instruction to a motor driving each of the axes of the machine tool main body 2 by a machining program set in advance and controls a relative position of each of the moving axes (X-axis, Y-axis, Z-axis) with respect to the workpiece 16 when machining is to be performed on the workpiece 16.

The numerical controller 3 executes measurement of the spindle error measurement jig 30 attached to the tool attaching portion 15 of the machine tool main body 2 by using the probe 5 in accordance with a spindle error compensation control program set in advance. It outputs the drive instruction to the motor of each of the axes of the machine tool main body 2 and controls the relative position of each of the moving axes (X-axis, Y-axis, Z-axis) with respect to the spindle error measurement jig 30 in accordance with a program (spindle error compensation control program) set in advance. The numerical controller 3 obtains data of a required position of the spindle error measurement jig 30 by receiving the output signal from the probe 5.

The numerical controller 3 executes the spindle error compensation control program to perform a series of processing, which includes spindle error measurement, spindle error calculation using the measurement result, spindle error compensation calculation for acquiring a compensation amount for compensating the spindle error obtained by the calculation, and setting of the compensation amount as a spindle error parameter.

The <spindle error measurement>, <spindle error calculation>, <spindle error compensation>, and <spindle error parameter setting> will be described below.

Figure 10A:
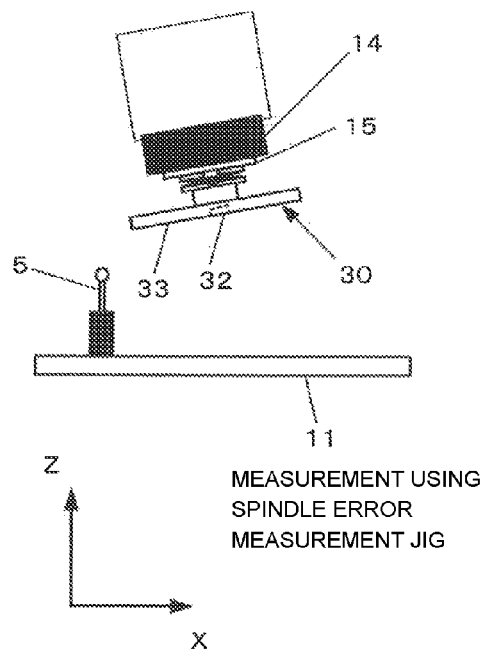
FIGS. 10A and 10B are diagrams for explaining a measurement example of the spindle error measurement jig.
Figure 10B:
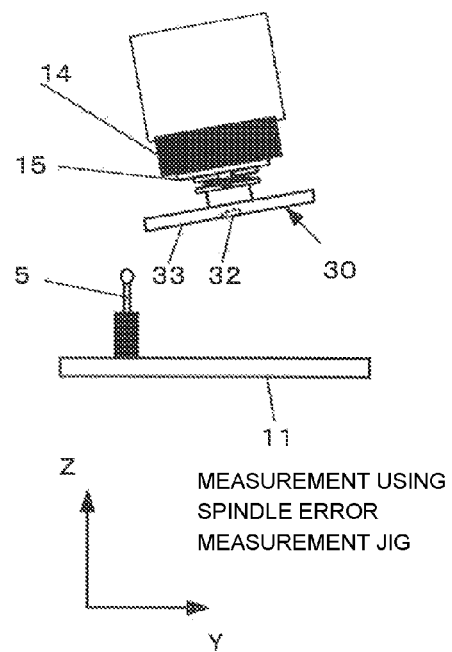

As illustrated in FIGS. 10A and 10B, the probe (contact-type measuring device) 5 allowing measurement in a moving axis direction of the machine tool 1 is installed on the table 11, the numerical controller 3 controls driving of each of the X-axis and the Y-axis of the table 11 and the Z-axis elevating the spindle head 14 and measures the spindle center position measurement hole 32 and the spindle angular deviation measurement end-face 33. As the probe (contact-type measuring device) 5, a known device such as a touch sensor which outputs a detection signal upon contact with a measurement target and the like can be used.

<Spindle Error Measurement>

The following (1) to (3) will be described by referring to FIG. 11.

(1) Measurement of Spindle Center Position

The spindle center position measurement hole 32 is measured at three or more points on a surface (inner peripheral surface of the spindle center position measurement hole 32) parallel to the spindle axis of the spindle center position measurement hole 32 by using the probe 5, and the spindle center position Q ($X_h$, $Y_h$, $Z_h$) at a start of the machine or after the spindle error occurrence operation can be calculated by using the measurement result.

Figure 11:
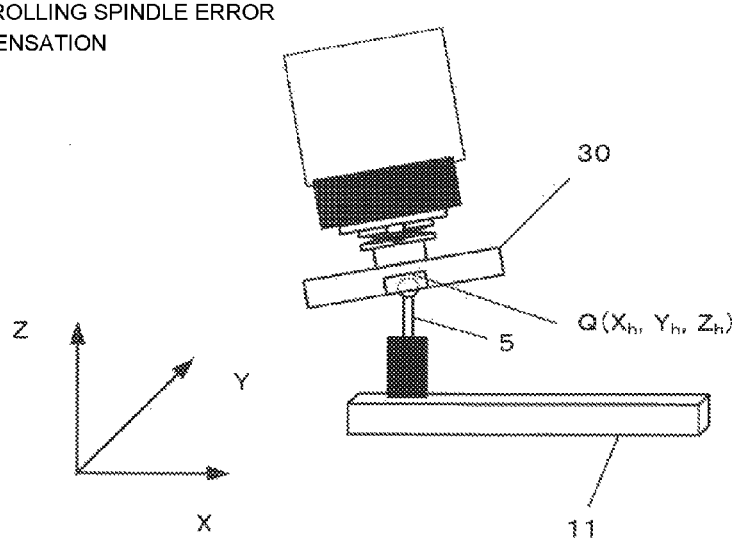
FIG. 11 is a diagram for explaining means for controlling spindle error compensation (No. 1)

More specifically, the probe 5 allowing measurement in the moving axis direction is installed on the table 11 as illustrated in FIG. 11, and numerical controller 3 controls driving of each of the moving axes which include the X-axis and the Y-axis of the table 11 and the Z-axis elevating the spindle head 14, and measures at least three different points on the same plane on the inner peripheral surface of the spindle center position measurement hole 32.

(2) Measurement of Attaching Error of Spindle Error Measurement Jig

Figure 12A:
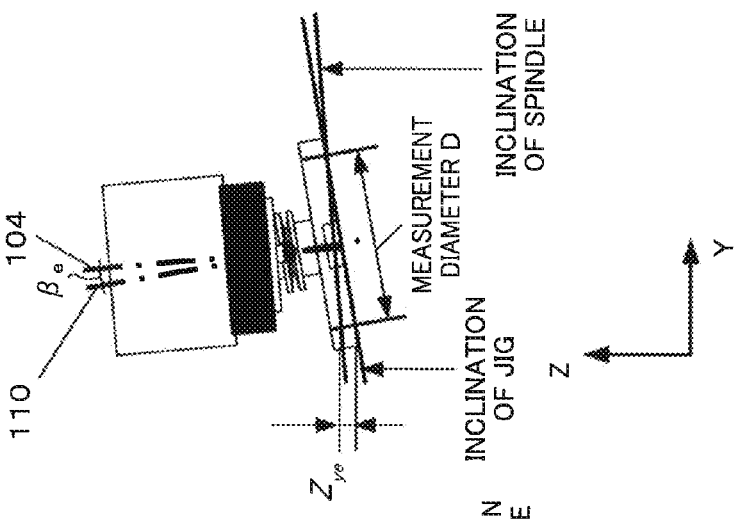
FIGS. 12A, 12B, and 12C are diagrams for explaining the means for controlling spindle error compensation (No. 2)

In the measurement of the spindle angular deviation measurement end-face 33, the spindle is rotated, at a position of an arbitrary measurement diameter D around the spindle center axis position Q, between 0 and 360° by using the probe 5 as illustrated in FIG. 12A, measurement is made at positions of three or more points, and an attaching error ($Z_{xe}$, $Z_{ye}$) of spindle error measurement jig in the spindle error measurement jig 30 with respect to the spindle is measured.

Figure 12B:
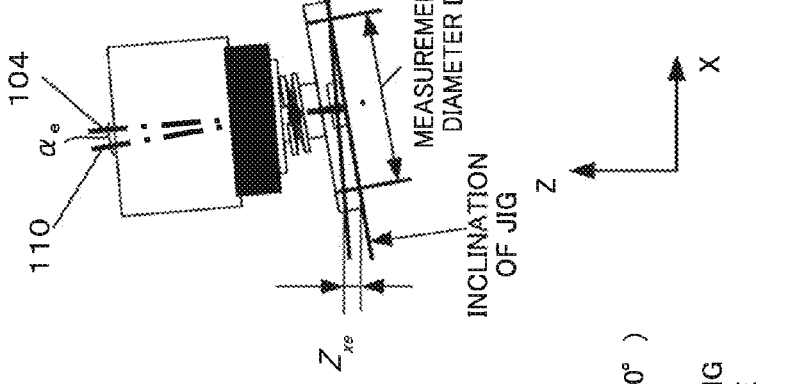
Figure 12C:
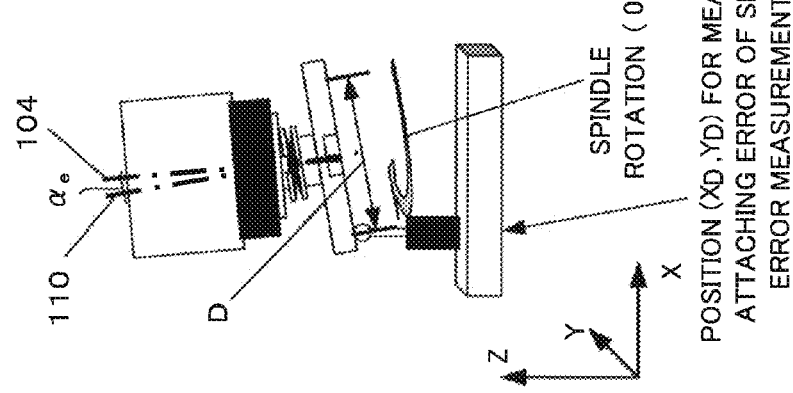

In FIGS. 12B and 12C, a measuring method of the attaching error ($Z_{xe}$, $Z_{ye}$) of spindle error measurement jig in 4-point measurement of the end face 33 is illustrated. According to this method, it is assumed that the X-axis direction is 0° in a state in which the spindle error measurement jig is attached to the spindle, and, in order to measure inclination of the jig in the X-axis and Y-axis directions, positions in the Z-axis direction at four points in total, that is, two points (0° and 180°) in the X-axis direction and two points (90° and 270°) in the Y-axis direction at corresponding angles at radial positions (D/2, 0) of the measurement diameter D around the spindle center position Q on each of the axes, are measured, and then the inclination of the jig in each of the axial directions is measured.

FIG. 12B explains a method of measuring the inclination of the jig in the X-axis direction. The probe 5 is placed at the position of (D/2, 0), and it is assumed that the position in the Z-axis direction of the spindle error measurement jig 30 detected by the probe 5 when a rotation angle of the spindle is 0° is $Z_{x1}$. Subsequently, it is assumed that the position in the Z-axis direction of the spindle error measurement jig 30 detected by the probe 5 when the rotation angle of the spindle is 180° is Z. Then, an error $Z_{xe}$ in a Z-X plane is expressed as $Z_{xe}=Z_{x2}-Z_{x1}$.

FIG. 12C explains a method of measuring the inclination of the jig in the Y-axis direction. It is assumed that the position in the Z direction of the spindle error measurement jig 30 detected by the probe 5 when the rotation angle of the spindle is 90° is $Z_{y1}$. Subsequently, it is assumed that the position in the Z direction of the spindle error measurement jig 30 detected by the probe 5 when the rotation angle of the spindle is 270° is Z. Then, an error $Z_{ye}$ in a Z-Y plane is expressed as $Z_{ye}=Z_{y2}-Z_{y1}$.

(3) Measurement of Spindle Angular Deviation

Subsequently, after the spindle is fixed (rotation angle is 0°), the table 11 on which the probe 5 is installed is operated in the X direction (the moving axis of the X-axis is driven), and by measuring the spindle angular deviation measurement end-face 33 in the spindle error measurement jig 30 at two positions on a straight line being a measurement diameter D of which $(X_h, Y_h, Z_h)$ is center, the positions in the Z direction of the spindle error measurement jig 30 are measured. The spindle angular deviation on the X-axis at the two positions is assumed to be $Z_{xh}$.

Subsequently, the table 11 on which the probe 5 is installed is operated in the Y direction (the moving axis of the Y-axis is driven), and by measuring the spindle angular deviation measurement end-face 33 in the spindle error measurement jig 30 at two positions on a straight line being a measurement diameter D of which $(X_h, Y_h, Z_h)$ is center, the positions in the Z direction of the spindle error measurement jig 30 are measured. The spindle angular deviation on the Y-axis at the two positions is assumed to be $Z_{yh}$.

Here, the spindle angular deviation is expressed as $(Z_{xh}, Z_{yh})$. The spindle angular deviation $(Z_{xh}, Z_{yh})$ includes an attaching error of the spindle error measurement jig 30 to the spindle.

<Spindle Error Calculation>

(4) A true spindle angular deviation $(Z_x, Z_y)$ obtained by subtracting the attaching error $(Z_{xe}, Z_{ye})$ of spindle error measurement jig from the spindle angular deviation $(Z_{xh}, Z_{yh})$ is acquired by the following expression (1):

$$Z_x = Z_{xh} - Z_{xe}$$

$$Z_y = Z_{yh} - Z_{ye}$$

$$\alpha_h = \tan^{-1}(Z_x/D)$$

$$\beta_h = \tan^{-1}(Z_y/D) \quad (1)$$

From the calculation result of the true spindle angular deviation $(Z_x, Z_y)$, a spindle angular deviation compensation amount $(\theta_C, \theta_A)$ is calculated by the following expression (2):

$\theta_C$ calculation formula $$Z_y \neq 0 \quad \theta_C = \tan^{-1}(Z_x/Z_y)$$

$$Z_y = 0, Z_x > 0 \quad \theta_C = 90°$$

$$Z_y = 0, Z_x < 0 \quad \theta_C = -90°$$

$\theta_A$ calculation formula $$Z_y \geq 0 \quad \theta_A = \tan^{-1}(r/D)$$

$$Z_y < 0 \quad \theta_A = -\tan^{-1}(r/D)$$

Where $$r = \sqrt{Z_x^2 + Z_y^2} \quad (2)$$

D: measurement diameter

<Spindle Error Compensation>

Figure 6A:
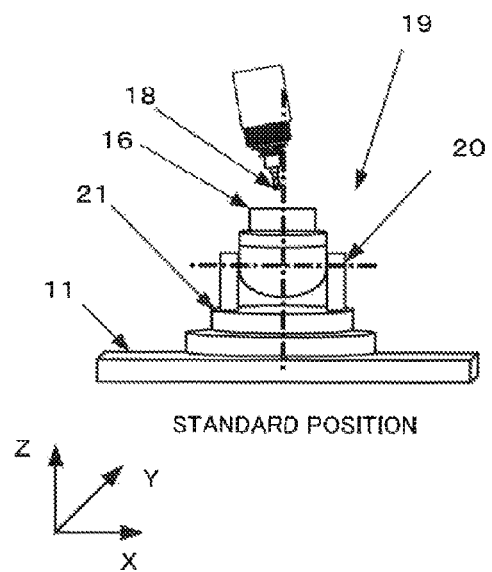
FIGS. 6A and 6B are diagrams for explaining the spindle error compensation rotary table.
Figure 6B:
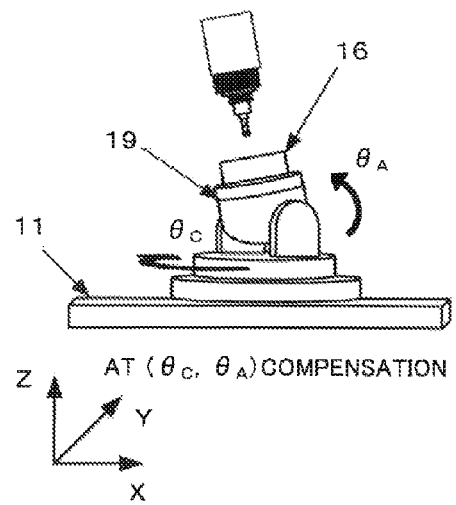

(5) The spindle error compensation rotary table 19 (see FIGS. 14A and 14B) for controlling the attitude of the workpiece perpendicular to or parallel to the spindle axis is a spindle error compensation rotary table having an inclined axis (A-axis) 20 using the rotary axis (C-axis) 21 as a bed. The rotary axis (C-axis) 21 rotates around an axis parallel to the moving axis (Z-axis) to which the spindle is fixed, and the inclined axis (A-axis) rotates around an axis parallel to an upper surface of the table 11 having two or more moving axes (X-axis, Y-axis). In FIGS. 6A and 6B, the inclined axis (A-axis) rotates around an axis parallel to the X-axis. By setting the spindle angular deviation compensation amount $(\theta_C, \theta_A)$ as a rotary table parameter of the spindle error compensation rotary table 19 and performing a compensation operation, the attitude of the workpiece 16 placed on the spindle error compensation rotary table 19 can be controlled perpendicular to and parallel to the spindle axis.

<Spindle Error Parameter Setting>

Figure 14A:
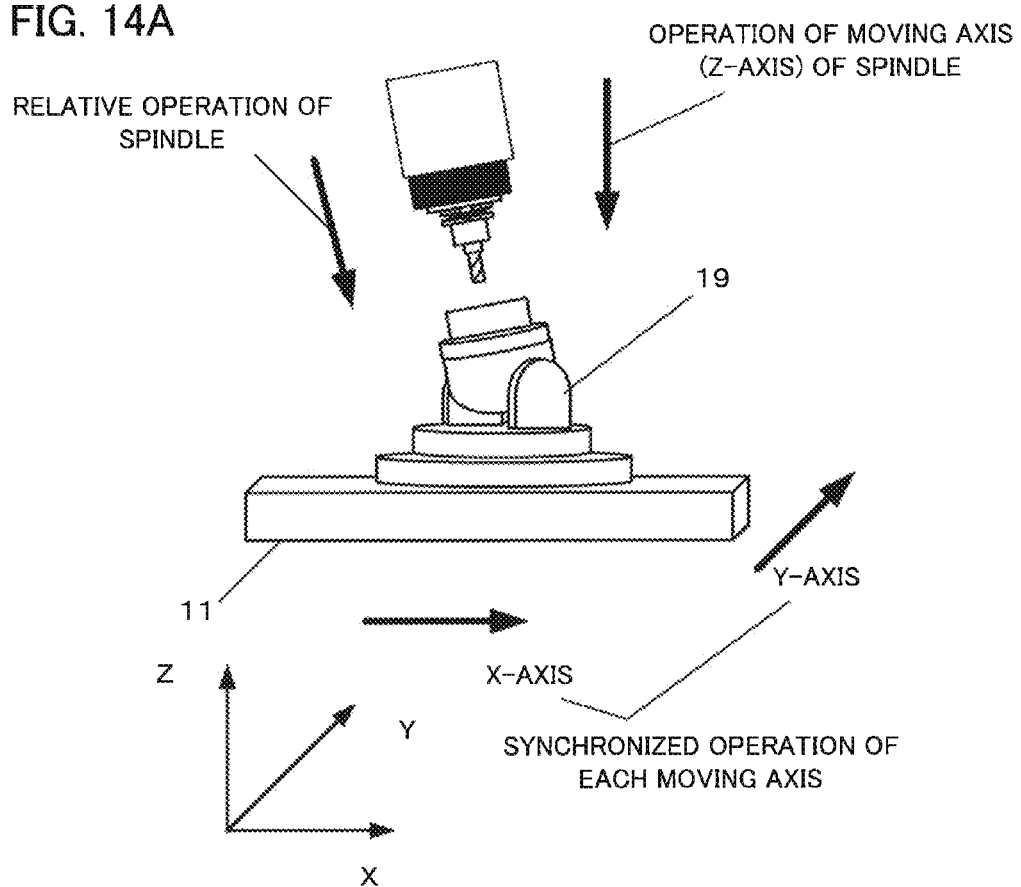
FIGS. 14A and 14B are diagrams for explaining means for table relative movement.
Figure 14B:
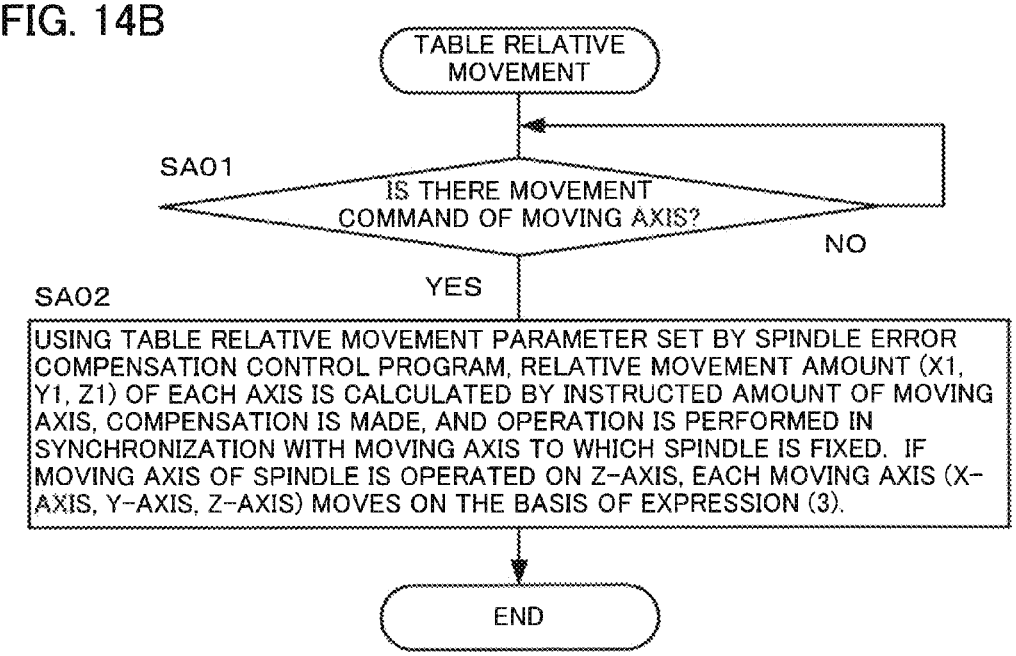

As illustrated in FIGS. 14A and 14B, to a table relative movement parameter of table relative moving means which is means for operating the spindle perpendicular to or parallel to the spindle axis, the spindle angular deviation compensation amount $(\alpha_h, \beta_h, \theta_C, \theta_A)$ calculated by the above described <spindle error calculation> is set. By relatively moving each of the moving axes (X-axis, Y-axis, Z-axis) so that the spindle operates perpendicular to or parallel to the spindle axis in accordance with a movement instruction as illustrated in FIGS. 14A and 14B, highly accurate machining can be realized to the attached machining tool (end mill 17, drill 18 and the like) and the workpiece 16.

As illustrated in FIG. 14B, by using the table relative movement parameter set by the spindle error compensation control means described by using FIGS. 11, 12A, 12B, 12C, 13A, and 13B, the relative movement amount $(X_1, Y_1, Z_1)$ of each axis is calculated by the instructed amount of the moving axis, compensation is made, and operation is performed in synchronization with the moving axis to which the spindle is fixed. When the moving axis of the spindle is operated with a movement amount Z, the relative movement amount $(X_1, Y_1, Z_1)$ of each axis is expressed by the following expression (3). Reference character $r_t$ is a movement amount of the table 11:

In the case of X-axis movement instruction:

$$X_X = X \times \cos\alpha_k,$$

$$Y_X = 0,$$

$$Z_X = X \times \sin\alpha_k$$

In the case of Y-axis movement instruction:

$$X_Y = 0,$$

-continued $$Y_Y = Y \times \cos\beta_k,$$

$$Z_Y = Y \times \sin\beta_k$$

In the case of Z-axis movement instruction:

$$X_Y = r_l \times \sin\theta_C$$

$$Y_X = r_l \times \cos\theta_C,$$

$$Z_Z = Z \times \cos\beta_k$$

Table movement amount:

$$r_l = Z \times \sin\theta_A$$

$$\begin{aligned}X_1 &= X_X + X_Y + X_Z \\ &= X \times \cos\alpha_h + 0 + r_t \times \sin\theta_C \\ &= X \times \cos\alpha_h + r_t \times \sin\theta_C\end{aligned} \quad (3)$$

$$\begin{aligned}Y_1 &= Y_X + Y_Y + Y_Z \\ &= 0 + Y \times \cos\beta_h + r_t \times \cos\theta_C \\ &= Y \times \cos\beta_h + r_t \times \cos\theta_C\end{aligned}$$

$$\begin{aligned}Z_1 &= Z_X + Z_Y + Z_Z \\ &= X \times \sin\alpha_h + Y \times \sin\beta_h + Z \times \cos\theta_A\end{aligned}$$

In the present invention, the compensation value calculated on the basis of the spindle angular deviation measured by the spindle error measurement jig 30, the probe 5, and the spindle error compensation control means (see FIGS. 11, 12A, 12B, 12C, 13A, and 13B) is set to the rotary table parameter of the spindle error compensation rotary table 19 and the table relative movement parameter of the table relative movement means (see FIGS. 14A and 14B), the spindle error compensation rotary table 19 and the workpiece 16 are subjected to control of attitude perpendicular to or parallel to the spindle axis, and the machining tool (end mill 17, drill 18 and the like) attached to the spindle is relatively moved by the table relative movement means parallel to the spindle axe so that highly accurate machining is performed on the workpiece 16 by the machining tool attached to the spindle.

Figure 15A:
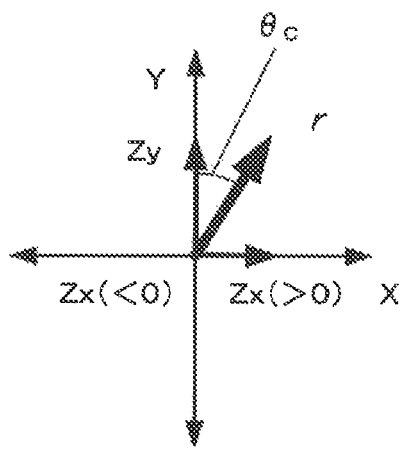
FIGS. 15A and 15B are diagrams for supplementary explanation of formula (2)
Figure 15B:
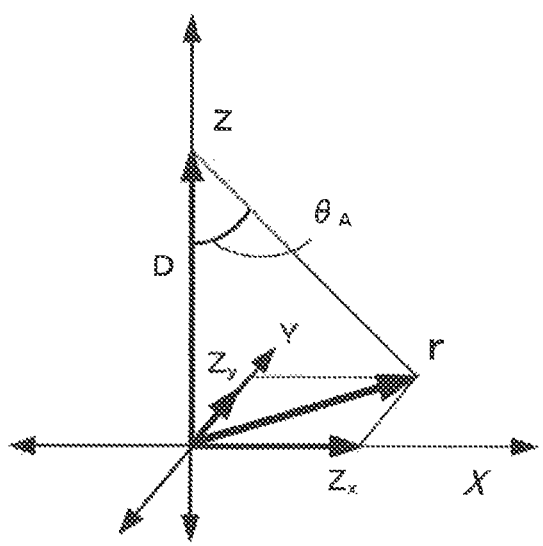

Here, supplementary explanation will be given to the expression (2) by using FIGS. 15A and 15B. Explanation will be given on the basis of the orientation of each rotary axis of the rotary table 19 illustrated in FIGS. 6A and 6B.

<How to Acquire $\theta_C$>

$\theta_C$ is obtained by substituting the respective values of $Z_x$ and $Z_y$ with each of the X-axis and Y-axis directions which are moving axes.

In the case of Zy≠0:

$$\theta_c = \tan^{-1}(Z_x/Z_y)$$

In the case of Zy=0:

$$Z_x > 0 \, \theta_C = 90°$$

$$Z_x < 0 \, \theta_C = -90°$$

<How to Acquire $\theta_A$>

$\theta_A$ is obtained by r calculated from the measurement diameter D and Zx and Zy.

$$r = \sqrt{(Z_x^2 + Z_y^2)}$$

$$Z_y \geq 0 \, \theta_A = \tan^{-1}(r/D)$$

$$Z_y < 0 \, \theta_A = -\tan^{-1}(r/D)$$

(Calculation Example)

Here, calculation examples of the expression (1), the expression (2), and the expression (3) are shown;

In the case of D=200.0, $Z_{x\_1}$=0, $Z_{x\_2}$=+0.01, $Z_{y\_1}$=0, $Z_{y\_2}$=−0.02:

$$Z_{xe} = Z_{x2} - Z_{x1} = 0.01$$

$$Z_{ye} = Z_{y2} - Z_{y1} = -0.02$$

Subsequently, $$Z_{xh} = +0.06, \, Z_{yh} = +0.08$$

$$Z_x = Z_{xh} - Z_{xe} = 0.06 - 0.01 = 0.05$$

$$Z_y = Z_{yh} - Z_{ye} = 0.08 - (-0.02) = 0.10$$

$$\begin{aligned}\alpha_h &= \tan^{-1}(Z_x/D) \\ &= \tan^{-1}(0.05/200) \\ &= 0.014324\end{aligned}$$

$$\begin{aligned}\beta_h &= \tan^{-1}(Z_y/D) \\ &= \tan^{-1}(0.10/200) \\ &= 0.028648\end{aligned}$$

Here, calculation examples of $\theta_C$ and $\theta_A$ are shown:

$$D = 200.0, \, Z_x = +0.05, \, Z_y = +0.1$$

$$\begin{aligned}\theta_C &= \tan^{-1}(Z_x/Z_y) \\ &= \tan^{-1}(0.05/0.1) \\ &= 26.565°\end{aligned}$$

$$\begin{aligned}\theta_A &= \tan^{-1}(r/D) \\ &= \tan^{-1}(\sqrt{(0.05^2 + 0.1^2)}/200.0) \\ &= 0.032\end{aligned}$$

Thus, $\theta_C = 26.565°$ $\theta_A = 0.032°$ (Calculation Example of X1, Y1, Z1)

Here, a calculation example of (X1, Y1, Z1) is shown:

If the movement instruction of each of the X, Y, and Z axes is X=300.0, Y=100.0, and Z=200.0:

$$\alpha_h = \tan^{-1}(Z_x/D) = 0.014324$$

$$\beta_h = \tan^{-1}(Z_y/D) = 0.028648$$

$$r_t = Z \times \sin\theta_A = 0.111701$$

$$\begin{aligned}X_1 &= X \times \cos\alpha_h + r_t \times \sin\theta_C \\ &= 299.0000006 + 0.049954 \\ &= 300.0499446\end{aligned}$$

-continued $$Y_1 = Y \times \cos\beta_h + r_t \times \cos\theta_C$$
$$= 99.9999875 + 0.09990845$$
$$= 100.099896$$

$$Z_1 = X \times \sin\alpha_h + Y \times \sin\beta_h + Z\cos\theta_A$$
$$= 0.075 + 0.05 + 199.9999688$$
$$= 200.1249688$$

thus,
$X_1$=300.0499446
$Y_1$=100.099896
$Z_1$=200.1249688

The invention claimed is:

1. A numerically-controlled machine tool comprising:
a linear moving axis for moving a spindle;
two or more linear moving axes for moving a table;
a rotary table for fixing a workpiece, installed on said table and having two or more rotary axes; and
a numerical controller for machining said workpiece by controlling said spindle, said linear moving axes, and said rotary axis, wherein
the numerically-controlled machine tool further comprises:
a spindle error measurement jig which is a member to be measured, attached to the spindle and provided with a spindle center position measurement hole having an inner surface which is a surface to be measured parallel to a spindle axis and a spindle angular deviation measurement end-face which is a surface to be measured perpendicular to said spindle axis;
a probe installed on said table and detecting said spindle center position measurement hole of the spindle error measurement jig and said end face of spindle angular deviation measurement;
a spindle angular deviation calculation unit for attaching said spindle error measurement jig to said spindle and calculating a spindle angular deviation from a result of measurement of the inner surface and the end face of said spindle error measurement jig by said probe;
a compensation amount calculation unit for calculating a compensation amount for compensating positions of said table and said rotary table from the calculated spindle angular deviation; and
a position compensation unit for moving said linear moving axis and said rotary table on the basis of the compensation amount.

2. The numerically-controlled machine tool according to claim 1, wherein
said spindle angular deviation calculation unit acquires a spindle center position from a result of measurement of three or more points on the same plane on the inner surface of the hole of said spindle error measurement jig by said probe; and
the spindle angular deviation is calculated from the result of measurement of three or more points on a circle having an arbitrary diameter around an intersection with a line obtained by lowering the end face of said spindle error measurement jig perpendicularly to the end face of said spindle error measurement jig from said spindle center position.

3. The numerically-controlled machine tool according to claim 2, wherein said spindle angular deviation calculation unit calculates a spindle attaching error of said spindle error measurement jig in addition to said spindle angular deviation; and
said compensation amount calculation unit calculates a compensation amount for compensating the positions of said table and said rotary table from said spindle attaching error and spindle angular deviation.

4. The numerically-controlled machine tool according to claim 1, wherein
said position compensation unit compensates each rotary axis on the basis of said compensation amount for each of two or more rotary axes of said rotary table, compensates positions of said rotary table and a workpiece perpendicular to or parallel to said spindle axis, calculates a relative movement compensation amount of each of the linear moving axes on the basis of said compensation amount so that said spindle moves perpendicular to or parallel to said workpiece in accordance with a movement instruction of each of the linear moving axes, and executes relative movement compensation of the movement instruction of each of the linear moving axes on the basis of the relative movement compensation amount.

5. A spindle error compensating method of a numerically-controlled machine tool provided with a numerical controller, wherein the numerically-controlled machine tool comprises a linear moving axis for moving a spindle, two or more linear moving axes for moving a table, a rotary table for fixing a workpiece, installed on said table and having two or more rotary axes, and a numerical controller for machining said workpiece by controlling said spindle, said linear moving axes, and said rotary axis, the method comprising steps of:
attaching a spindle error measurement jig which is a member to be measured, provided with a spindle center position measurement hole having an inner surface which is a surface to be measured in parallel with a spindle axis of said machine tool and a spindle angular deviation measurement end-face which is a surface to be measured and perpendicular to said spindle axis to a spindle;
detecting said spindle center position measurement hole and said spindle angular deviation measurement end-face by said spindle error measurement jig by using a probe installed on a table for fixing a rotary table on which the workpiece is placed;
calculating a spindle angular deviation from a result of detection of the inner surface and the end face of said spindle error measurement jig by said probe;
calculating a compensation amount for compensating positions of said table and said rotary table from said calculated spindle angular deviation; and
moving said linear moving axis and said rotary table on the basis of said compensation amount.

6. The spindle error compensating method of the numerically-controlled machine tool according to claim 5, wherein
said spindle angular deviation is calculated by acquiring a spindle center position from a result of measurement of three or more points on the same plane which is the inner surface of the hole of said spindle error measurement jig by said probe and a result of measurement of three or more points on a circle having an arbitrary diameter around an intersection with a line obtained by lowering the end face of said spindle error measurement jig perpendicularly to the end face of said spindle error measurement jig from said spindle center position.

7. The spindle error compensating method of the numerically-controlled machine tool according to claim 5, wherein
in addition to said spindle angular deviation, a spindle attaching error of the spindle error measurement jig is calculated; and
a compensation amount for compensating the positions of said table and said rotary table is calculated from said spindle attaching error and the spindle angular deviation.

8. The spindle error compensating method of the numerically-controlled machine tool according to claim 5, wherein
regarding said movement, each of the rotary axes is compensated with respect to each of the two or more rotary axes of said rotary table on the basis of said compensation amount, the positions of said workpiece installed on the rotary table is compensated perpendicular to or parallel to said spindle axis, the relative movement compensation amount of each of the linear moving axes is calculated on the basis of said compensation amount so that said spindle moves perpendicular to or parallel to said workpiece in accordance with the movement instruction of each of the linear moving axes, and relative movement compensation of the movement instruction of each of the linear moving axes is made on the basis of the relative movement compensation amount.

* * * * *